United States Patent [19]

Langevin

[11] 4,023,631

[45] May 17, 1977

[54] ADJUSTABLE BALANCE AND INDICATING DEVICE

[76] Inventor: Donald R. Langevin, 3117 SE. 19th Ave., Cape Coral, Fla. 33904

[22] Filed: Dec. 4, 1975

[21] Appl. No.: 637,735

[52] U.S. Cl. .................................. 177/46; 177/166; 177/173

[51] Int. Cl.[2] .................. G01G 23/18; G01G 23/14

[58] Field of Search ............. 177/46, 164, 166, 173

[56] References Cited

UNITED STATES PATENTS

| | | | |
|---|---|---|---|
| 1,576,375 | 3/1926 | Spinks | 177/173 |
| 1,712,767 | 5/1929 | Johnson | 177/46 |
| 2,009,020 | 7/1935 | Flanagan | 177/46 |
| 2,659,593 | 11/1953 | Singleton | 177/173 |
| 2,666,635 | 1/1954 | Holt | 177/164 |
| 3,031,021 | 4/1962 | Hale et al. | 177/173 |
| 3,174,566 | 3/1965 | Perry, Jr. | 177/46 X |
| 3,189,110 | 6/1965 | Yarborough | 177/46 X |
| 3,458,003 | 7/1969 | Garvey | 177/164 X |

Primary Examiner—George H. Miller, Jr.
Attorney, Agent, or Firm—Duckworth, Hobby, Orman, Allen & Pettis

[57] ABSTRACT

An adjustable balance and indicating device for removably attaching to a beam scale of the type having a balance beam with a distended end thereof movable in an oscillating plane and having further a support adjacent the balance beam. The adjustable balance and indicating device includes a bracket for removably mounting to the support adjacent the balance beam and a coupler having a first end coupled to the balance beam and a second end spaced therefrom. The balancing and indicating device also includes an indicator for illustrating the displacement of the second end of the coupler from a reference position representative of the balance beam being in a balancing condition. A deformable member is included for providing a biasing force on the second end of the coupler to displace the second end to the reference position, thereby balancing the balance beam of the balance beam scale.

20 Claims, 1 Drawing Figure

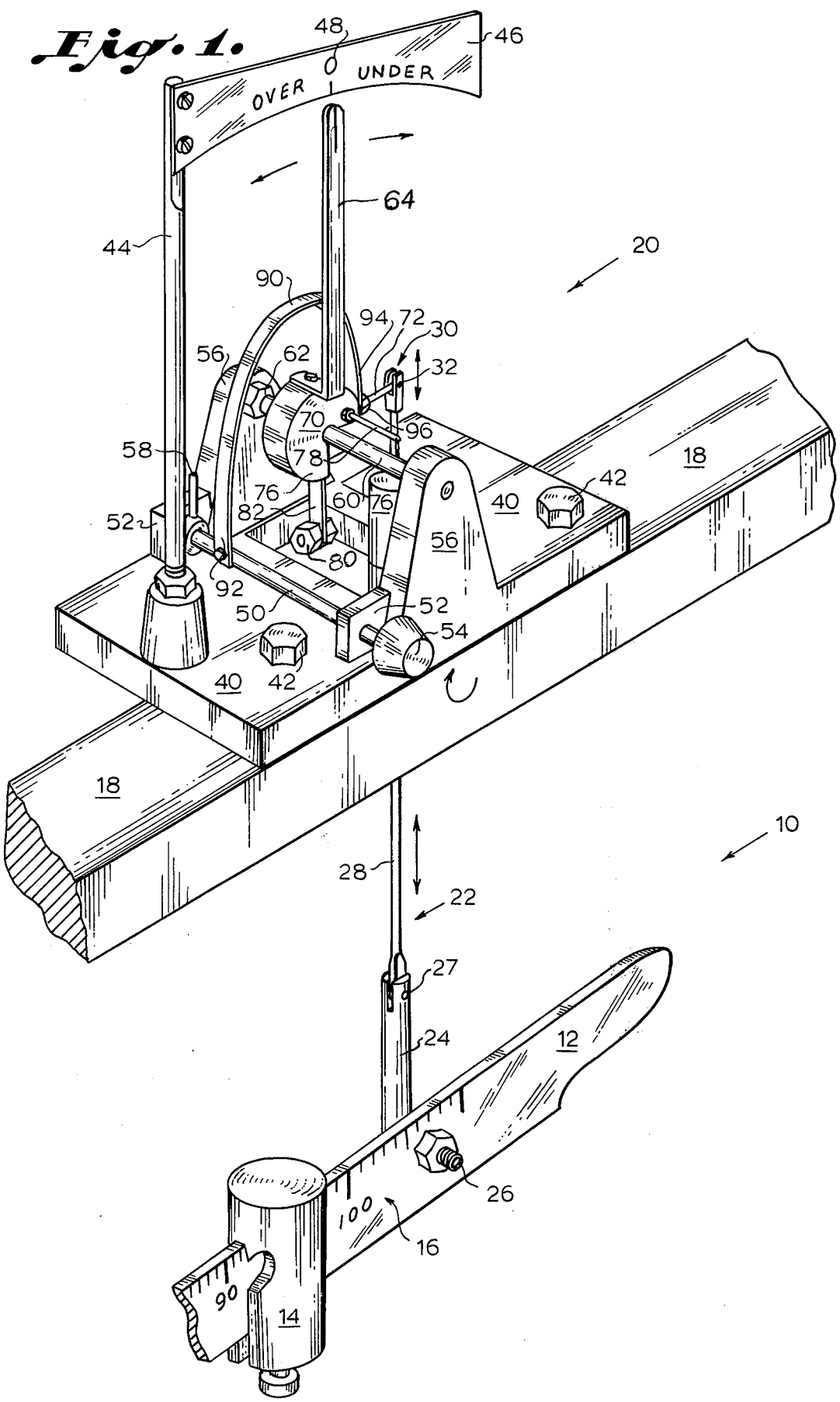

ADJUSTABLE BALANCE AND INDICATING DEVICE

BACKGROUND OF THE INVENTION

1. Field of the Invention

This invention relates to indicating devices for being attached to balancing scales, and in particular to an indicating device including means for adjusting the fine zero balance of balance beam scales.

2. Description of the Prior Art

Attachments for weighing scales of the balance beam type are well known in the art. These indicating devices allow the operator to accurately observe when the balance beam has achieved a balancing condition without the necessity of straining ones eyes or sighting along the longitudinal axis of the balance beam. The over/under nomenclature has become standard for indicating to the operator whether additional material must be added to or subtracted from the bulk material being weighed. These attachments may be used on any type of balance beam scale, including the more common gravity and spring operated designs.

However, previous designs have required extensive set up and calibration procedures which often affect the critical fine balancing mechanisms of the balance beam scale. Furthermore, when the scale is moved or even accidentally jarred, the balance beam zero adjustment is often displaced and the operator must then laboriously proceed through the entire balancing and rezeroing process again. It is an object of this invention to include with the over/under indicating attachment for a balance beam scale the additional feature of a zeroing control for simultaneously adjusting the over-/under indicator device and the balancing beam scale to a balancing condition.

J. M. Spinks in U.S. Pat. No. 1,576,375 discloses an over/under indicating attachment for balance beam scales, with the over/under indicator including a balancing lever mounted off center on the frame and a connecting rod connected at one end to the balance beam and pivotally connected at the other end to the balancing lever. An indicator is carried by the balancing lever and moves adjacent to a chart for indicating the balancing or over/under condition.

Other over/under indicator devices for balancing beam scales are disclosed by Singleton, in U.S. Pat. No. 2,659,593; Hale et al in U.S. Pat. No. 3,031,021; and Hamblin et al. in U.S. Pat. No. 1,800,017. In general, these prior art inventions utilize a static balancing technique which is not readily adaptable for repeated rapid rebalancing.

Other over/under indicators already incorporated into balancing beam scales are disclosed by Fate in U.S. Pat. No. 2,467,300; Breaden in U.S. Pat. No. 2,032,910; Breaden in U.S. Pat. No. 1,896,281; Hadley in U.S. Pat. No. 1,759,900; and Marer in U.S. Pat. No. 876,986.

SUMMARY OF THE INVENTION

An adjustable balance and indicating device for removably attaching to a beam scale of the type having a balance beam with a distended end thereof movable in an oscillating plane and having further a support adjacent to the balancing beam. The adjustable balance and indicating device includes a bracket for removably mounting to the support adjacent the balancing beam, and a coupler having a first end thereof coupled to the balancing beam and a second end spaced therefrom. Indicating means are included for indicating the displacement of the second end of the coupler from a reference position representative of the balance beam being in a balancing condition. Adjustable biasing means are included for providing a biasing force on the second end of the coupler of displacing the second end to the reference position, thereby balancing the balance beam of the balance beam scale.

In a first preferred embodiment of the present invention, the adjustable biasing means includes a deformable member movably coupled about a first end thereof to the bracket and coupled about a second end thereof to the second end of the coupler, with the deformable member being bowed between the first and second ends for providing a first force therebetween.

BRIEF DESCRIPTION OF THE DRAWINGS

FIG. 1 illustrates a perspective view of a first preferred embodiment of the adjustable balance and indicating device.

DETAILED DESCRIPTION OF THE PREFERRED EMBODIMENT

An adjustable balance and indicating device, shown generally as 20 in FIG. 1, is attached to a balance beam scale, shown generally as 10, including a balance beam 12 having a poise 14 movably mounted thereon for being adjusted to accurately balance the weight of the unknown mass. The balance beam 12 also includes a marking scale 16 along the longitudinal axis thereof for use in conjunction with the poise 14 to indicate the mass of the article being weighed.

The adjustable balance and indicating device 20 includes a coupler 22 having a first end 24 coupled to the distended end of the balancing beam 12 by a nut and bolt combination 26. The first end 24 of the coupler 22 is movably coupled to a center portion 28 of the coupler 22 by a pivot mechanism 27. The coupler 22 and the balance beam 12 may move generally in a plane of oscillation parallel to the plane of the balance beam 12 and perpendicular to the rotational axis of the pivot (not shown) of the balance beam 12. A second end 30 of the coupler 22 couples through a bore (not shown) in a support 18 adjacent to the balancing beam 12 of the balance beam scale 10. This bore must be located and drilled by the operator when the adjustable balance and indicating device 20 is attached to the balance beam scale 10. The length of the center portion 28 of the coupler 22 may be adjusted as required for proper installation and balancing.

The adjustable balance and indicating device 20 includes a bracket 40 coupled to the support 18 by a pair of bolt and nut combinations 42 communicating therebetween. The bracket 40 includes a first vertical support 44 having an over/under chart legend 46 attached perpendicularly thereto. A first shaft 50 (or zero control shaft or means for varying the bow) is rotatably coupled at each end thereof by a pair of bracket supports 52 to the bracket 40. The first shaft 50 is rotated by a knob 54 at one end thereof. The close communication between the shaft 50 and the bracket supports 52 provides a resistance against any rotation of the shaft 50, thereby securing or locking its position after rotation.

A second shaft 60 (or guiding means or guiding shaft) is rotatably coupled to the bracket 40 by a pair of bracket supports 56, one at each end of the second shaft 60. The second shaft 60 is coupled to the support brackets 56 by needle point bearings 62 at each end thereof for allowing the second shaft 60 to rotate freely in response to a movement of the balance beam 12 and the coupler 22. The second shaft 60 rotates about a longitudinal axis therethrough which is generally perpendicular to the plane of movement or oscillation of the balance beam 12. The second shaft 60 has attached adjacent one end thereof a hub or spacer 70 mounted coaxially thereon. The hub 70 has a first end of a spacer shaft 72 attached thereto. The spacer shaft 72 is perpendicular to the longitudinal axis of the second shaft 60 and the hub 70. A second end of the spacer shaft 72 is movably coupled to a second end 30 of the coupler 22 by a pivot 32. This coupling arrangement allows the oscillating motion of the balance beam 12 to be communicated through the coupler 22 and the spacer shaft 72 to cause a rotation of the second shaft 60 around its longitudinal axis.

A pointer or indicator 64 is attached to a circumferential surface of the hub 70 perpendicular to the longitudinal axis of the second shaft 60. The indicator 64 together with the chart legend 46 comprise an indicator means for indicating the relative angular displacement of the second shaft 60 from a reference position noted by a zero mark 48 on the chart legend 46. In other words, when the indicator 64 is pointing toward the reference position 48 on the chart legend 46, the second end 30 of the coupler 22 is also at a reference position which represents a balancing condition of the balance beam 12. The hub 70 also includes an accessory shaft 78 having a piston (hidden) of a dash pot 76 attached thereto for dampening the oscillating motion of the hub 70 and the indicator 64 about the longitudinal axis of the second shaft 60.

The hub 70 is generally disc shaped, but describes only a 270 degree arc. The lower semicircular section of the hub 70 includes only a 90 degree section counterbalance weight 76 for partially counterbalancing the weight of the spacer shaft 72 and the accessory shaft 78. Furthermore, a nut and bolt combination 80 is coupled by a flexible strip 82 to a vertical surface adjacent to the counterbalance section 76 of the hub 70. The nut and bolt combination 80 (or restoring force means) exerts a restoring force upon the hub 70, and therefore the shaft 60, when it rotates about its longitudinal axis. This restoring force is produced when the nut and bolt combination 80 is lifted by the hub 70 as it rotates with the second shaft 60. This restoring force will, of course, be in a direction opposite the rotation of the shaft 60 for returning the shaft to its reference position.

A deformable flexible member 90 (or flexture spring, bowed member, zeroing means) has a first end 92 tangentially coupled to the first shaft 50. A second end 94 of the deformable member 90 is coupled to the spacer shaft 72 intermediate its ends and held in contact with a circumferential surface of the hub 70 by operation of a locking nut 96. The deformable member 90 is formed of a generally planar strip of metal or polymer material which is then deformed into a bow or U-shape by fastening its first and second ends as previously described. This deformation of the deformable member 90 exerts a first force (or biasing force or adjusting force) generally tangential to the surface of the hub 70 and therefore generally tangential to the second shaft 60. This first force (or biasing force) counteracts a clockwise force (as viewed in FIG. 1) upon the second shaft 60 and the hub 70 caused by the additional weight of the coupler 22 and the spacer shaft 72 attached thereto. The first force may be increased by rotating the first shaft 50 in a counterclockwise direction (as shown in FIG. 1) to increase the bow or deformation of the deformable member 90. In a similar manner, the rotation of the first shaft 50 in a clockwise direction (as shown in FIG. 1) will decrease the first force upon the hub 70. A limit shaft 58 is coupled to the first shaft 50 for limiting the rotation thereof and therefore limiting the first force upon the hub 70.

The operation of the adjustable balance and indicating device will now be described with reference to FIG. 1. It will first be assumed that the adjustable balance and indicating device 20 has been attached to the support 18 of the balance beam scales 10 as previously described. It will also be assumed that the length of the coupler 22 has been adjusted so that the indicator 64 is pointing toward the reference position 48 on the chart legend 46 when the balance beam 12 is in a balancing condition. When an unknown mass is placed upon the scales 10 and the poise 14 is moved along the balance beam 12 the indicator 64 will point toward the appropriate markings on the chart legend 46 to indicate whether the weight adjacent to the poise 14 on the marking scale 16 is either over or under the exact weight. Of course, when the exact weight is determined by accurately positioning the poise 14 along the balance beam 12, the indicator 64 will point toward the reference position 48 on the chart legend 46.

Now assume that the balance beam scale 10 has been jarred or for some other reason has become slightly unbalanced. The operator merely grasps the knob 54 and rotates the first shaft 50 to either increase or decrease the first force provided by the deformable member 90. The deformation or bow of the deformable member 90 is adjusted so that the first force (or biasing force) produced by the deformable member 90 exactly counterbalances and cancels any residual biasing forces produced by the imbalance of the balance beam 12. Further adjustent of the first shaft 50 and the deformable member 90 may be required to adjust the first force to reposition or rezero the indicator 64 adjacent to the reference position 48 on the chart legend 46. Once this operation has been accomplished the balance beam scales 10 may be used in a normal manner.

Thus, an adjustable balance and indicating device for removably attaching to a balance beam scale has been described which allows the operator to simultaneously zero the balance beam of the balance beam scale and the over/under indicator attached thereto. However, this invention is not to be construed as limited to the particular forms disclosed herein since these embodiments are to be regarded as illustrative rather than restrictive.

I claim:

1. An adjustable balance and indicating device for removably attaching to a beam scale of the type having a balance beam with a distended end thereof movable in an oscillating plane and having further a support adjacent said balance beam, said adjustable balance and indicating device comprising:
 a bracket for removably mounting to said support adjacent said balance beam;
 a coupler having a first end thereof coupled to said balance beam and a second end spaced therefrom;
 indicating means for indicating the displacement of said second end of said coupler from a reference position representative of said balance beam being in a balancing condition; and adjustable biasing means for providing a biasing force on said second end of said coupler for displacing said second end to said reference position and thereby balancing said balance beam scale, with said adjustable biasing means comprising a deformable member coupled about a first end thereof to said bracket and coupled about a second end thereof to said second end of said coupler, with said deformable member being bowed between said first and second ends for providing a first force therebetween.

2. The adjustable balance and indicating device as described in claim 1 wherein said adjustable biasing means further comprises:

restoring force means for providing a restoring force on said second end of said coupler responsive to a displacement thereof from said reference position; and means coupled to said deformable member for adjusting said first force to balance said residual biasing forces and for offsetting said second end of said coupler to said reference position.

3. The adjustable balance and indicating device is recited in claim 2 wherein said first force of said residual biasing means and said restoring force are parallel to said oscillating plane.

4. The adjustable balance and indicating device as recited in claim 2 wherein said means for adjusting said first force comprises means for varying said bow of said deformable member.

5. The adjustable balance and indicating device as recited in claim 4 wherein said means for varying said bow of said deformable member comprises:

a first shaft rotatably coupled to said bracket;
means for coupling said first end of said deformable member to said first shaft; and
means for rotating said shaft, whereby the bow of said deformable member is altered.

6. The adjustable balance and indicating device as recited in claim 2 further including means for guiding said first force of said residual biasing means.

7. The adjustable balance and indicating device as recited in claim 6 wherein said means for guiding said first force comprises:

a second shaft rotatably coupled to said bracket; and
end coupling means for coupling said second end of said deformable member to said shaft, with said first force guided for rotating said second shaft about a longitudinal axis thereof.

8. The adjustable balance and indicating device as recited in claim 7 wherein said one end coupling means comprises:

a spacer having one end thereof coupled to said second shaft perpendicular to said longitudinal axis, said spacer having said second end of said coupler attached adjacent to another end thereof, with said second end of said deformable member coupled to said spacer intermediate its ends.

9. The adjustable balance and indicating device as recited in claim 8 further including dashpot means coupled to said spacer for dampening rotational oscillations of said second shaft.

10. The adjustable balance and indicating device as recited in claim 7 wherein said indicating means comprises:

a pointer coupled to said second shaft; and a legend supported adjacent to a distended end of said pointer for indicating the position thereof.

11. The adjustable balance and indicating device as recited in claim 10 wherein said legend includes a balancing mark thereon representative of said balance beam being in a balancing condition.

12. The adjustable balance and indicating device as recited in claim 11 wherein said second shaft includes at each end thereof needle bearing means for for rotatably coupling with said bracket.

13. An adjustable balance and indicating device for removably attaching to a beam scale of the type having a balance beam with a distended end thereof movable within an oscillating plane, and having further a support adjacent to said balancing beam, said adjustable balance and indicating device comprising in combination:

a bracket for mounting to said support adjacent to said balancing beam;

a guiding shaft rotatably coupled about a longitudinal axis thereof to said bracket;

coupling means interposed between said shaft and said balancing beam for translating the oscillation of said distended end of said balancing beam into a rotation of said guiding shaft;

indicating means coupled to said guiding shaft for indicating a rotational displacement thereof from a reference position, said reference position reflecting a balancing condition for said balance beam;

a resiliently deformable member coupled between said coupling means and said bracket for providing a counterbalancing force therebetween, said counterbalancing force being continuously exerted in a direction opposite the gravitationally induced biasing force exerted on said coupling means and said indicating means; and zeroing means for varying the deformation of said resiliently deformable member, whereby said counterbalancing force may be balanced with said biasing force for rotating said shaft to said reference position.

14. The adjustable balance and indicating means as recited in claim 13 further including restoring force means coupled to said guiding shaft for providing a restoring force thereon responsive to a rotational displacement of said shaft from said reference position.

15. The adjustable balance and indicating means as recited in claim 13 wherein said coupling means includes adjusting means for varying the length thereof, whereby the length of said coupling means may be adjusted for coincidence of said balancing of said balance beam and said indicating means reflecting a balancing condition.

16. The adjustable balance and indicating device as recited in claim 13 wherein said deformable member is coupled about a first end thereof to said bracket and coupled about a second end thereof to said guiding shaft, with said deformable member being bowed between said first and second ends thereof for producing said counterbalancing force therebetween.

17. The adjustable balance and indicating device as recited in claim 16 wherein said zeroing means comprises means for varying said bow of said resiliently deformable member.

18. The adjustable balance and indicating device as recited in claim 17 wherein said coupling means comprises a coupling shaft capable of transmitting compression and tension forces longitudinally therealong.

19. An adjustable balancing and indicating device for removably attaching to a beam scale of the type having a balance beam and a frame support adjacent thereto, said adjustable balance and indicating device comprising in combination:

- a bracket for removably mounting to said frame support adjacent said balance beam;
- a coupler having a first end thereof coupled to said balance beam;
- indicating means coupled to said coupler for indicating the displacement of said first end of said coupler from a reference position representative of said balance beam being in a balancing condition;
- deformable counterforce means coupled between said second end of said coupler and said bracket for exerting a continuously adjustable counterforce therebetween in a direction opposite the effective gravitational force exerted on said coupler and said indicating means attached thereto; and
- continuously adjustable zeroing means coupled to said deformable counterforce means for varying the deformation thereof for producing a balancing between said counterforce and said effective gravitational force exerted on said coupler and said indicating means attached thereto, whereby said indicating means may be adjusted to said reference position representative of said balancing beam being in a balancing condition.

20. The adjustable balancing and indicating device as described in claim 19 wherein said deformable counterforce means comprises a resiliently deformable member coupled about a first end thereof to said bracket and about a second end thereof to said second end of said coupler, with said deformable member being bowed between said first and second ends for providing said counterforce therebetween.

* * * * *